(12) United States Patent
Tiana et al.

(10) Patent No.: US 11,119,379 B1
(45) Date of Patent: Sep. 14, 2021

(54) SPATIALLY ADDRESSABLE ELECTROCHROMIC LIGHT MODULATOR

(71) Applicant: Rockwell Collins, Inc., Cedar Rapids, IA (US)

(72) Inventors: Carlo L. Tiana, Portland, OR (US); Eric P. Stratton, Portland, OR (US); Christopher A. Keith, Wilsonville, OR (US); Robert D. Brown, Lake Oswego, OR (US); Robert W. Wood, Beaverton, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/945,708

(22) Filed: Apr. 4, 2018

(51) Int. Cl.
*G02F 1/163* (2006.01)
*G02F 1/133* (2006.01)
*G02F 1/13357* (2006.01)

(52) U.S. Cl.
CPC .......... *G02F 1/163* (2013.01); *G02F 1/13318* (2013.01); *G02F 1/133602* (2013.01)

(58) Field of Classification Search
CPC .............. G02F 1/163; G02F 1/13318; G02F 1/133602; G02B 27/0172; G03B 9/02; G03B 11/00

USPC .......................................................... 359/265
See application file for complete search history.

(56) References Cited

U.S. PATENT DOCUMENTS

| | | | | |
|---|---|---|---|---|
| 2013/0271378 A1* | 10/2013 | Hulford | ............... | G06F 3/14 345/168 |
| 2016/0085130 A1* | 3/2016 | Timofejevs | ............... | G02F 1/15 359/275 |
| 2017/0212398 A1* | 7/2017 | Cao | ............... | H01L 21/77 |

* cited by examiner

*Primary Examiner* — Wen Huang
(74) *Attorney, Agent, or Firm* — Suiter Swantz pc llo

(57) ABSTRACT

An optical device includes an electrochromic layer, a plurality of electronic drivers, and a controller. The electrochromic layer includes a plurality of electrochromic regions separated from each other. The plurality of electronic drivers are arranged to electrically connect with and drive respective of the electrochromic regions. The controller is configured to control the plurality of electronic drivers to individually address each of the plurality of electrochromic regions to selectively drive some of the plurality of electrochromic regions to change light transmission of the selectively driven plurality of electrochromic regions.

11 Claims, 6 Drawing Sheets

SPATIALLY ADDRESSABLE ELECTROCHROMIC LIGHT MODULATOR

The inventive concepts disclosed herein generally relate to the field of electrochromic light modulators and displays employing such modulators.

BACKGROUND

Electrochromic material technology provides the ability to dim transparent surfaces by applying an electric potential across the electrochromic material. For example, electrochromic materials are used on aircraft windows to dim the light from the sun to shield an observer within the aircraft looking at or out of the window.

Solid state lighting displays may be dimmed by adjusting the current to the light sources of the display. For example, for a liquid crystal display (LCD) having light emitting diodes (LEDs) as light sources, the brightness of the LEDs is adjusted, and thus the display brightness is correspondingly varied. There are different schemes for adjusting the brightness of the light sources of the display. One scheme is amplitude modulation where current to the LEDs is adjusted to vary their brightness. Another scheme is pulse width modulation where current or power to the LEDs is turned on or off at different times in order to vary the brightness of the LEDs. Amplitude modulation and pulse width modulation can be used in unison to increase the dynamic range of the brightness variation.

Solid state light devices require a minimum amount of current in order to operate, and thus a minimum brightness can be achieved by driving the device to the minimum current for the minimum amount of time. As solid state lighting becomes more efficient, the amount of brightness per unit power or current increases. This has the impact of making it more difficult to dim the light source as solid state lighting becomes more efficient. The low end brightness levels are no longer achievable because the solid state device will not turn on to provide the low end brightness levels, or the solid state device is too unstable at extremely low currents. In systems where extremely high brightness is required, one cannot simply decrease the optical system efficiency in order to counteract this effect because high optical system efficiency is required to achieve the high brightness levels at a reasonable LED input. In certain applications it is possible to reduce the number of solid state light sources in order to reduce the amount of light, but other considerations such as display uniformity, system efficiency, and heat dissipation all become tradeoffs in certain applications.

SUMMARY

In one aspect, embodiments of the inventive concepts disclosed herein are directed to an optical device. The optical device includes an electrochromic layer, one or more electronic drivers, and a controller. The electrochromic layer includes a single electrochromic region. The one or more electronic drivers are arranged to electrically connect with and drive the single electrochromic region. The controller is configured to control the one or more electronic drivers to address the single electrochromic region to drive the single electrochromic region to change the light transmission of the single electrochromic region over a range of light transmissions.

In a further aspect, embodiments of the inventive concepts disclosed herein are directed to an optical device. The optical device includes an electrochromic layer, a plurality of electronic drivers, and a controller. The electrochromic layer includes a plurality of electrochromic regions separated from each other. The plurality of electronic drivers are arranged to electrically connect with and drive respective of the electrochromic regions. The controller is configured to control the plurality of electronic drivers to individually address each of the plurality of electrochromic regions to selectively drive some of the plurality of electrochromic regions to change light transmission of the selectively driven plurality of electrochromic regions.

In a further aspect, embodiments of the inventive concepts disclosed herein are directed to an optical display. The optical display includes an electrochromic layer, one or more electronic drivers and a controller. The electrochromic layer includes one or more electrochromic regions separated from each other. The one or more electronic drivers are arranged to electrically connect with and drive respective of the electrochromic regions. The controller is configured to control the one or more electronic drivers to individually address each of the plurality of one or more electrochromic regions to selectively drive some of the one or more electrochromic regions to change light transmission of the selectively driven one or more electrochromic regions.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Embodiments of the inventive concepts disclosed herein regarding transparent displays with electrochromic material provide for electrically variable dimming by controlling the voltage applied to the electrochromic material to control the light transmission of the electrochromic material. Controlling the electrochromic material to control its light transmission in the context of the display can significantly increase the dynamic range of the brightness of the display. In particular, the control of the light transmission is specifically advantageous for extremely low brightness operations. The dynamic range of the brightness of the display may be increased buy a factor of 10 or more.

The control of the light transmission of the electrochromic material is particularly beneficial in reducing the minimum brightness levels of the display. A low brightness display is ideal for night mode operation of see through displays, counteracts instability of solid state lighting at low current thus improving performance, and enables the ability to maintain low brightness levels as solid state lighting efficiencies increase.

Moreover, according to embodiments of the inventive concepts disclosed herein, because the variable dimming is provided electronically, no moving parts are required to change the transmission of a device with electrochromic material, and a controller to control the dimming of the electrochromic material. This provides an improvement over systems which require mechanically moving parts to change transmission in an optical device, such as an iris of a camera.

Moreover, embodiments of the inventive concepts disclosed herein regarding transparent displays with electrochromic material provide for selectively addressing regions of electrochromic material. Beneficially, only certain regions of the transparent display need be dimmed. In particular, the content regions of the background may have an increased contrast through dimming while the non-content regions of the display may not have an increased contrast. Thus, the contrast of the content regions could be increased without increasing the contrast of the non-content regions by selectively dimming only certain regions.

According to some embodiments of the inventive concepts disclosed herein, electrochromic regions of the display are individually addressable regions. In this way only some of the electrochromic regions may be addressed depending upon the application. Further, the electrochromic regions could have a variety of shapes, sizes and positions depending upon the application.

Figure 1:
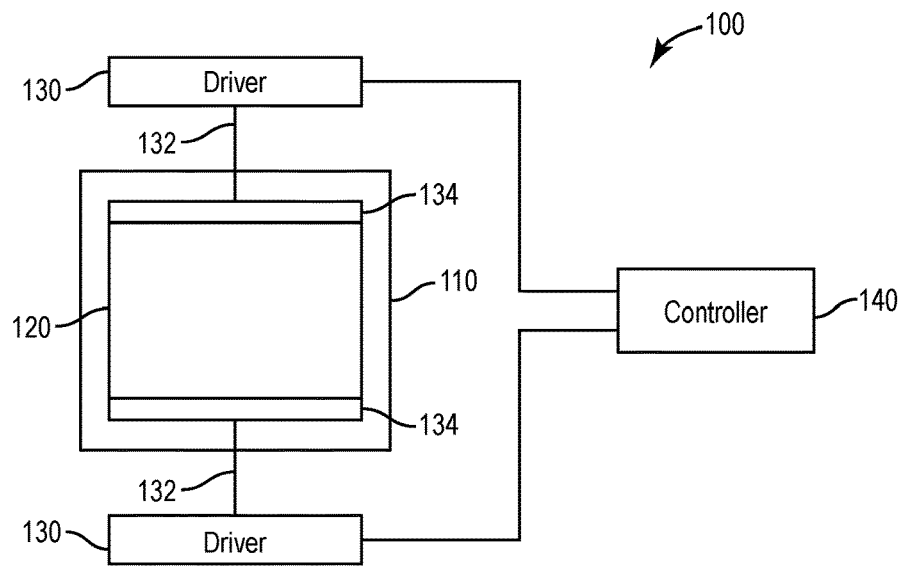
FIG. 1 is a schematic illustrating an optical device according to inventive concepts disclosed herein.

FIG. 1 is a schematic illustrating an optical device 100 according to inventive concepts disclosed herein. The optical device 100 includes an electrochromic layer 110, one or more electronic drivers 130, and a controller 140.

The electrochromic layer 110 includes one or more electrochromic regions 120 separated from each other. While FIG. 1 illustrates a single electrochromic region 120, in general the number of electrochromic regions 120 may be more than one.

The electrochromic regions 120 may include an electrochromic material. The electrochromic material may be liquid crystal based, or transmission metal oxide based, for example. When an electrical potential is applied across the electrochromic material, the light transmission of the electrochromic material decreases. In particular, the light transmission of the electrochromic material decreases as the potential applied increases.

The electrochromic regions 120 may operate such that their reflectivity changes with the electrical potential applied. In this case, when the reflectivity increases, less light is passed through the electrochromic region 120, although the transmission of the electrochromic region 120 itself may not change.

The electrochromic regions 120 may not overlap. The inventive concepts disclosed herein, however, are not so limited. The electrochromic regions 120 may have some overlap according to inventive concepts disclosed herein, although remaining separated from each other.

The electronic drivers 130 are arranged to electrically connect with and drive the electrochromic regions 120. In this regard the optical device 100 may include wires 132 and electrodes 134 electrically connecting the electronic drivers 130 to the electrochromic regions 120. The electrodes 134 contact the electrochromic regions 120. The wires 132 electrically connect the electronic drivers 130 to the electrodes 134. When a potential (voltage) difference is applied by the drivers 130 via the wires 132 and electrodes 134 to one of the electrochromic regions 120, the transmission of the electrochromic region 120 may decrease. The amount of the decrease in transmission of the electrochromic region 120 may increase as the voltage difference increases.

In FIG. 1, the electronic drivers 130 are arranged at the top and the bottom of the electrochromic layer 110. The inventive concepts disclosed herein are not limited to this arrangement. The electronic drivers 130 may be arranged on other sides of the electrochromic layer 110, such as on the left and right sides, and may extend in the vertical direction. Further, the electronic drivers 130 may be arranged to be on more than, or less than, two sides of the electrochromic layer 110. For example, two electronic drivers 130 may be arranged on a same side of the electrochromic layer 110. Alternatively, four electronic drivers 130 may be arranged respectively on the four sides of the electrochromic layer 110.

The wires 132 may be may be substantially invisible so that they are not readily seen by an observer of the display 100. In this regard, the wires 132 may be made of a transparent electrically conducting material, such as indium tin oxide (ITO), for example. Alternatively, the wires 132 may be of a small size such that they are not readily seen.

The optical device 100 may include a controller 140 according to inventive concepts disclosed herein. The controller 140 is connected to, and configured to control, the electronic drivers 130, so as to individually address each of the one or more electrochromic regions 120, to selectively drive some of the one or more electrochromic regions 120 to change light transmission of the selectively driven one or more electrochromic regions 120. The controller 140 may include, for example, a processor and a memory.

Figure 2:
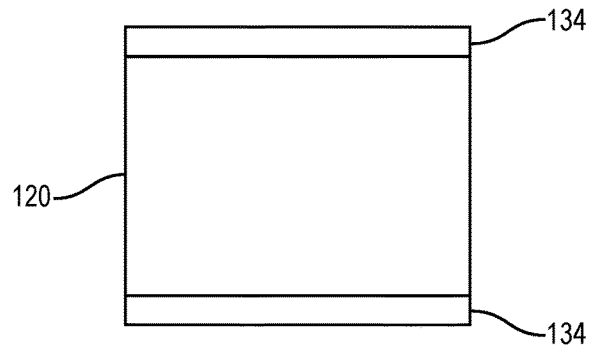
FIG. 2 is a schematic illustrating a portion of an optical device with a single electrochromic region according to inventive concepts disclosed herein.

FIG. 2 is a schematic illustrating an embodiment with a portion of the optical device 100 having a single electrochromic region 120 according to inventive concepts disclosed herein. FIG. 2, illustrates the single electrochromic region 120 with electrodes 134 contacting opposite sides of the single electrochromic region 120. The controller 140 is configured to control the electronic drivers 130 (see FIG. 1) to change the light transmission of the single electrochromic region 120 over a range of light transmissions. Thus, the single electrochromic region 120 may function as a neutral density filter, or a sunshade, for example, depending on the application.

Figure 3:
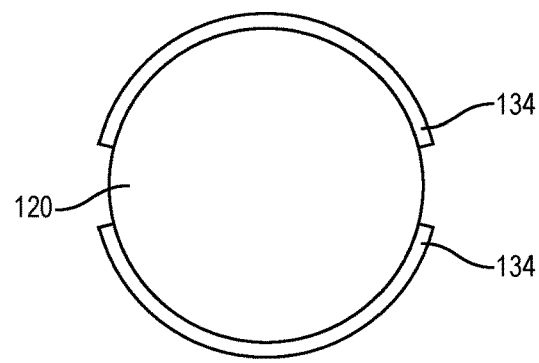
FIG. 3 is a schematic illustrating a portion of an optical device with a single electrochromic region having a circular shape according to inventive concepts disclosed herein.

FIG. 3 is a schematic illustrating an embodiment with a portion of the optical device 100 having a single electrochromic region 120 according to inventive concepts disclosed herein. In contrast to the arrangement in FIG. 2 where the single electrochromic region 120 has a rectangular shape, FIG. 3 illustrate an embodiment where the single electrochromic region 120 has a circular shape. According to inventive concepts disclosed herein the single electrochromic region 120 may have shapes other than circular or rectangular. In a similar fashion to the embodiment of FIG. 2, FIG. 3 illustrates an embodiment where the electrodes 134 contact opposite sides of the single electrochromic region 120. The controller 140 is configured to control the electronic drivers 130 (see FIG. 1) to change the light transmission of the single electrochromic region 120 over a range of light transmissions. Thus, the single electrochromic region 120 may function as a neutral density filter. In one example application of FIG. 3, the optical device 100 could be a camera, where the electrochromic region 120 function as a neutral density filter for a lens of the camera.

Figure 4:
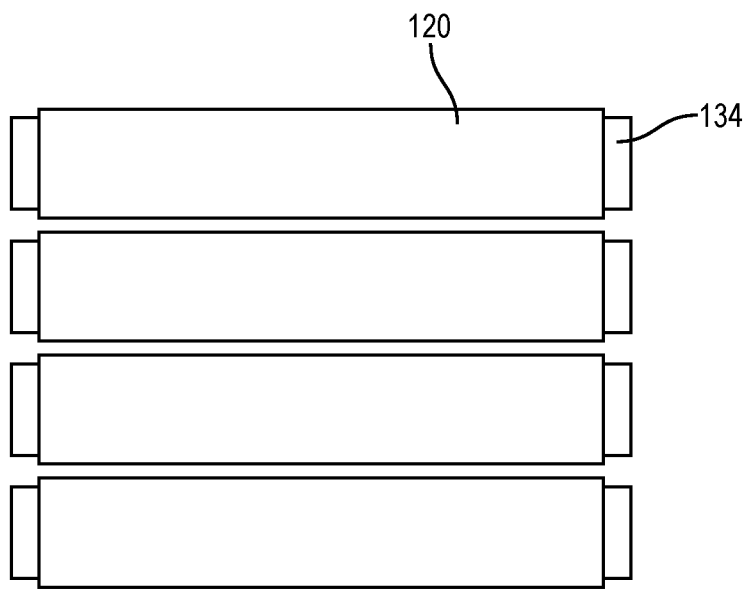
FIG. 4 is a schematic illustrating a portion of an optical device with strips of electrochromic regions according to inventive concepts disclosed herein.

FIG. 4 is a schematic illustrating an embodiment with a portion of the optical device 100 having a plurality of electrochromic regions 120 according to inventive concepts disclosed herein. FIG. 4 illustrates the plurality of electrochromic regions 120 with electrodes 134 contacting opposite sides of the plurality of electrochromic regions 120. The plurality of electrochromic regions 120 may be arranged as a plurality of strips as shown in FIG. 4. The controller 140 is configured to control the electronic drivers 130 (see FIG. 1) to provide a transmission appropriate for each of the electrochromic regions 120. For example, with the strip arrangement as shown in FIG. 4, the device 100 may function as a horizon modulator. In this case the plurality of electrochromic regions 120 may be arranged to extend in the horizontal direction. In the case the sun is in the sky, and an observer is viewing through the horizon modulator, the electrochromic region 120 through which the sun is viewed is controlled to have the lowest light transmission to block the brightness of the sun. In general, the electrochromic regions 120 are controlled to have a lower light transmission if they correspond to a brighter region of the sky.

Figure 5:
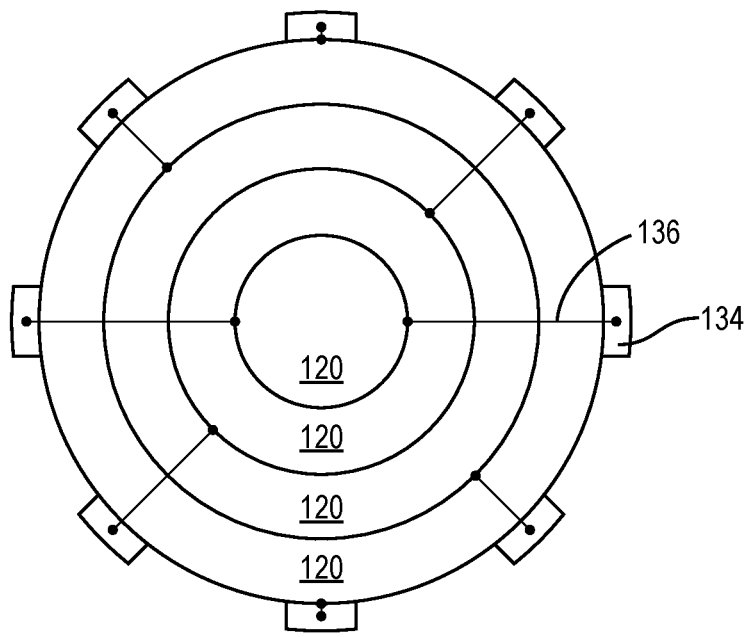
FIG. 5 is a schematic illustrating a portion of an optical device with concentric electrochromic regions according to inventive concepts disclosed herein.

FIG. 5 is a schematic illustrating an embodiment with a portion of the optical device 100 having a plurality of electrochromic regions 120 according to inventive concepts disclosed herein. FIG. 5 illustrates the plurality of electrochromic regions 120 with electrodes 134 contacting opposite sides of the plurality of electrochromic regions 120 via wires 136. The plurality of electrochromic regions 120 may be arranged as a plurality concentric regions as shown in FIG. 5. The controller 140 is configured to control the electronic drivers 130 (see FIG. 1) to provide a transmission appropriate for each of the electrochromic regions 120. For example, with the arrangement as shown in FIG. 5, the device 100 may function as an iris. In this case the optical device 100 may be part of a camera. The size of the iris may be formed by appropriately applying voltages to the electrochromic regions 120 arranged as a concentric regions. For example. If the iris is intended to be entirely closed, the voltage is controlled to each of the electrochromic regions 120 so that all of the electrochromic regions 120 are opaque. If the iris is intended to be entirely opened, the voltage is controlled to each of the electrochromic regions 120 so that all of the electrochromic regions 120 are transparent. If the iris is intended to be partially opened, the voltage is controlled to each of the electrochromic regions 120 so that appropriate ones of outer electrochromic regions 120 are opaque, while appropriate ones of inner electrochromic regions 120 are transparent. Thus the size of the iris may be varied according to the control of the concentric electrochromic regions 120 to be transparent or opaque as appropriate.

Figure 6:
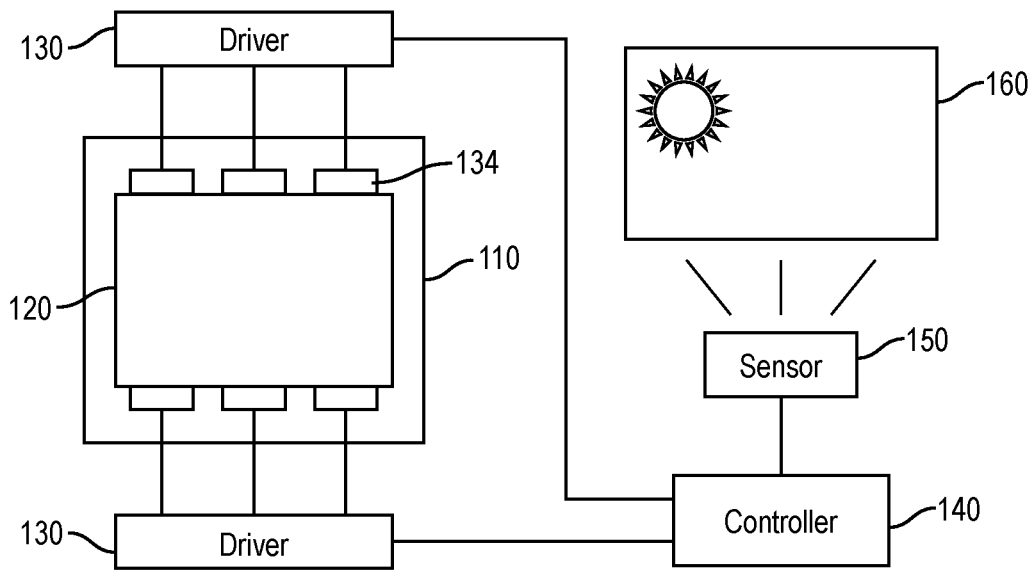
FIG. 6 is a schematic illustrating an optical device with a single electrochromic region, a plurality of electrodes and a light sensor according to inventive concepts disclosed herein.

FIG. 6 is a schematic illustrating an embodiment with an optical device 100 having a single electrochromic region 120 according to inventive concepts disclosed herein. FIG. 6 illustrates the single electrochromic region 120 with a plurality of electrodes 134 on each side of the single electrochromic region 120 and contacting opposite sides of the single electrochromic region 120. The total number of electrodes 134 is three or more. The controller 140 is configured to control the electronic drivers 130 to cause the electronic drivers 130 to apply different voltages to different individual electrodes 134.

The optical device further includes a light intensity sensor 150 arranged to detect light intensity of regions of a two-dimensional scene 160. The regions of the scene respectively corresponding to regions of the single electrochromic region 120. The light intensity sensor 150 provides a light intensity signal to the controller 120 based on the light intensity of the different regions of the scene 160.

The controller 140 is configured to control the one or more electronic drivers 130 to cause the one or more electronic drivers 130 to apply different voltages to different of the plurality of electrodes 134 to set the light transmission of the regions of the single electrochromic region 120 based on detected light intensity of respective of the regions of the scene 160. For example, the controller 140 is configured to control the one or more electronic drivers 130 to cause the one or more electronic drivers 130 to apply different voltages to different of the plurality of electrodes 134 to set the light transmission to be lower for the regions of the single electrochromic region 122 which correspond to regions of the scene having a greater detected light intensity. In this way the single electrochromic region 122 may be darkened in different regions as appropriate.

By applying different voltages to different of the plurality of electrodes 134, the electric field in the single electrochromic region 122 may vary, and thus likewise the light transmission in the single electrochromic region 122 may vary and be non-uniform.

Figure 7:
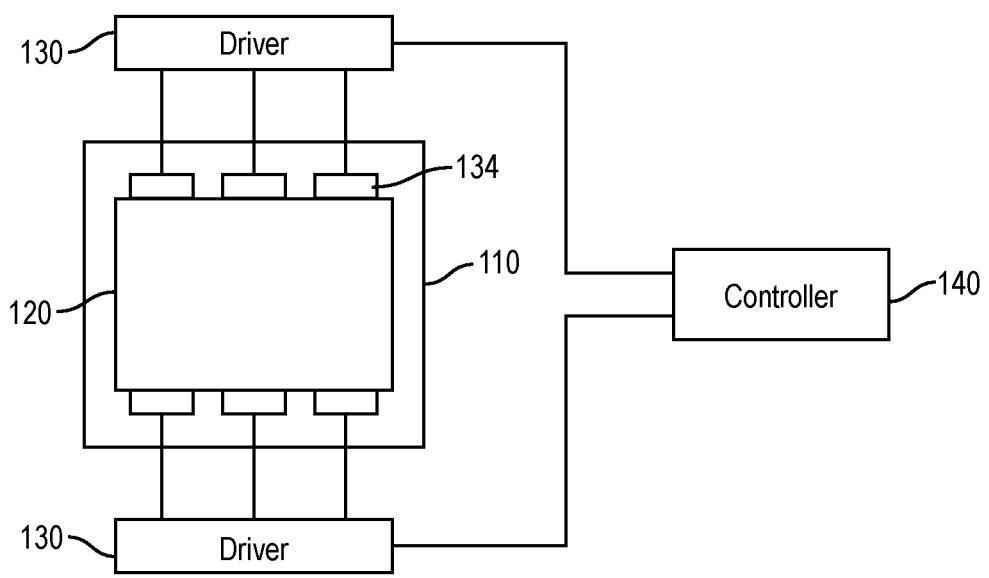
FIG. 7 is a schematic illustrating an optical device with a single electrochromic region and a plurality of electrodes according to inventive concepts disclosed herein.

FIG. 7 is a schematic illustrating an embodiment with an optical device 100 having a single electrochromic region 120 according to inventive concepts disclosed herein. FIG. 7 is similar to FIG. 6, but need not have the sensor 150 of the optical device 100 of FIG. 6. FIG. 7 illustrates the single electrochromic region 120 with a plurality of electrodes 134 on each side of the single electrochromic region 120 and contacting opposite sides of the single electrochromic region 120. The total number of electrodes 134 is three or more. The controller 140 is configured to control the electronic drivers 130 to cause the electronic drivers 130 to apply different voltages to different electrodes 134.

The controller 140 is configured to control the one or more electronic drivers 130 to cause the one or more electronic drivers 130 to apply different voltages to different of the plurality of electrodes 134 to set the light transmission of the regions of the single electrochromic region 120. In particular, the controller 140 is configured to control the one or more electronic drivers 130 to cause the one or more electronic drivers 130 to apply time varying voltages to the plurality of electrodes. The time varying voltages applied by the electrodes 134 may have a different frequency for different of the plurality of electrodes. The time varying voltages applied may be sinusoidal over time, for example. Thus, the controller 140 may provide time modulated electric fields in the single electrochromic region 120.

Figure 8:
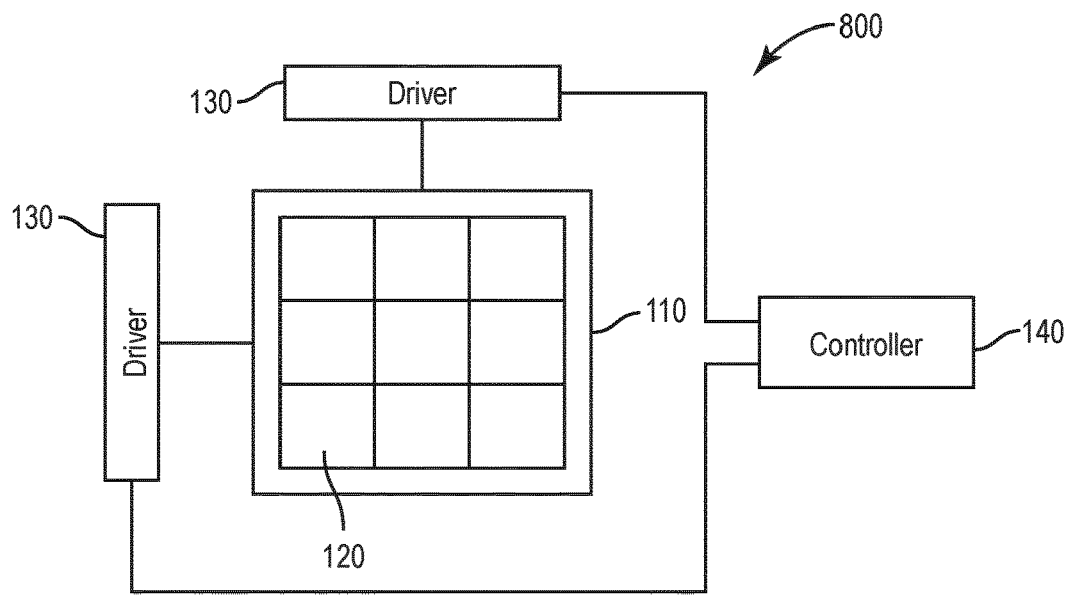
FIG. 8 is a schematic illustrating an optical device with an array of electrochromic regions according to inventive concepts disclosed herein.
Figure 9:
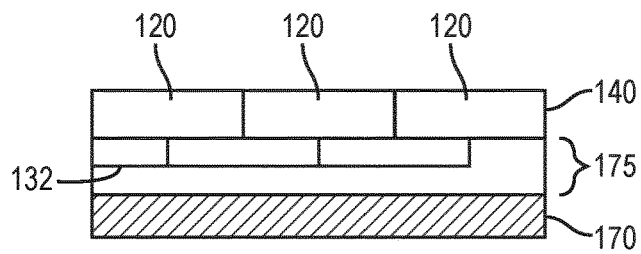
FIG. 9 is a side view of a portion of the optical device of FIG. 8 according to inventive concepts disclosed herein.
Figure 10:
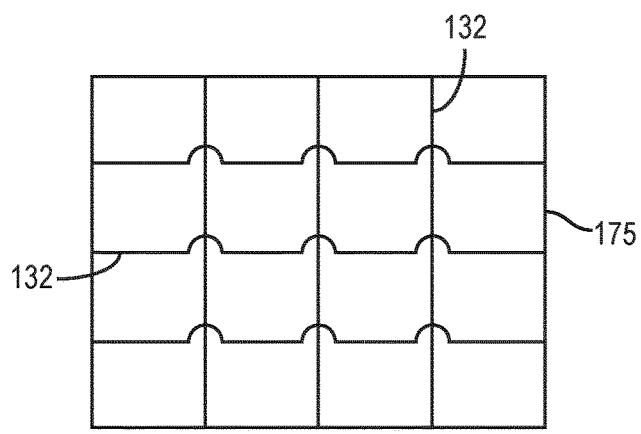
FIG. 10 is a view of a wiring layer of the optical device of FIG. 8 according to inventive concepts disclosed herein.

FIGS. 8-10 are schematics illustrating an optical device 800 according to inventive concepts disclosed herein, where FIG. 8 illustrates a top view, FIG. 9 illustrates a side view, and FIG. 10 illustrates a wiring layer 175 of the device 800. The optical device 800 includes an electrochromic layer 110 having a plurality of electrochromic regions 120 separated from each other, one or more electronic drivers 130, and a controller 140. The electrochromic regions 120 may be arranged in an array as shown in FIG. 8. While the array of electrochromic regions 120 illustrated in FIG. 8 includes nine separated electrochromic regions 120 arranged as a 3×3 array, in general the array be larger or smaller than 3×3.

In the case that the optical device 800 is a display, the optical device 800 may include a display region 170 which may display information in certain embodiments. FIGS. 8 and 9 illustrate the electrochromic layer 110 to be on top of the display 170. The inventive concepts herein are not so limited. The electrochromic layer 110 may be under the display 170, and need not be immediately adjacent, as long as the electrochromic layer 110 is arranged so as to dim light from or to the display region 170.

The optical device 800 of FIG. 8 need not be a display, for example, and may not include the display region 170. The optical device 800 of FIG. 8 may be separate from the display region 170.

The electronic drivers 130 are arranged to electrically connect with and drive the electrochromic regions 120. In this regard the optical device 800 may include a wiring layer 175 as shown in FIGS. 9 and 10. The wiring layer 175 includes a number of wires 132 electrically connecting the electronic drivers 130 to the electrochromic regions 120. The wires 132 electrically connect the electronic drivers 130 to the electrodes 134. For an arrangement with an array of electrochromic regions 120 as shown in FIG. 8, the wires 132 may be arranged in a grid formation as shown in FIG. 10. The wires 132 may be made of conductive material and embedded within a transparent material of the wiring layer 175. The wires 132 may be made of a transparent material such as indium tin oxide (ITO). Alternatively, the wires may be of a small size so as to be substantially transparent.

The display region 170 may be a transparent display region which transmits light. The display region 170 may be, for example, a liquid crystal display (LCD), or some other type of display region.

Figure 11:
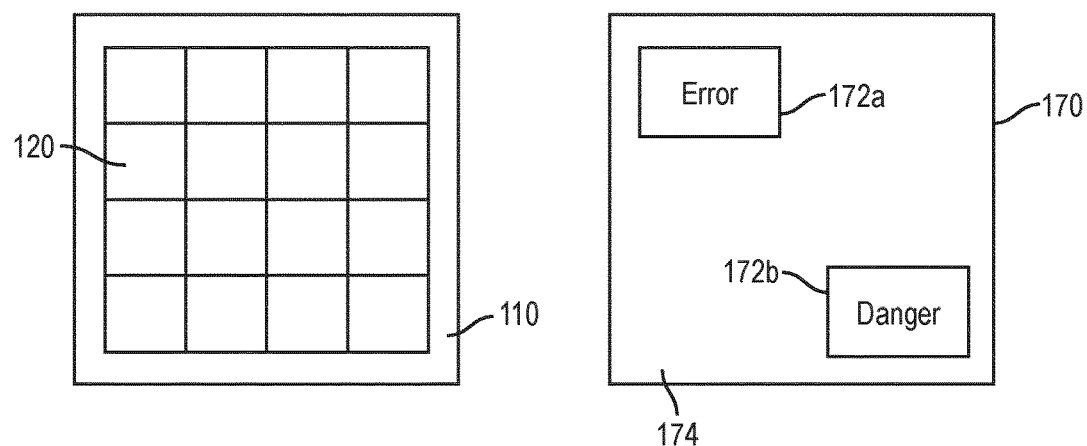
FIG. 11 is an exploded view illustrating the display region and the electrochromic layer according to inventive concepts disclosed herein.

Referring to FIG. 11, the display region 170 may include both content regions 172 and non-content regions 174. The content regions 172 may include text or symbols providing information to a user. For example, FIG. 11 illustrates two content regions 172a and 172b with the text "Error" and "Danger", respectively.

FIG. 11 is an exploded view illustrating the display region 170 and the electrochromic layer 110 according to inventive concepts disclosed herein, where the electrochromic regions 120 are arranged in an array. The display region 170 has two content regions 172a and 172b. In the case where the content regions 172a and 172b are to have an increased contrast, the electrochromic regions 120 are controlled to have a light transmission such that the content regions 172a and 172b have an increased contrast. For example, in the case that decreasing the light transmission for the content regions provides an increased contrast for the content regions, the four electrochromic regions 120 in the upper left corner decrease light transmission for the content region 172a, the four electrochromic regions 120 in the lower right corner decrease light transmission for the content region 172b, the four electrochromic regions 120 in the lower left corner increase light transmission, and the four electrochromic regions 120 in the upper right corner increase light transmission.

The arrangement of the electrochromic regions 120 along with the individually addressable nature of the electrochromic regions 120 allow for significant flexibility in controlling light transmission of regions from the display region 170. In general, referring to FIG. 8, the controller 140 is configured to control the electronic drivers 130 to individually address each of the plurality of electrochromic regions 120, and to drive at least some of the plurality of electrochromic regions 120 to change the light transmission to portions of the display region 170. A variety of control techniques are described below.

The controller 140 may be configured to control the electronic drivers 130 to address the plurality of electrochromic regions 120 to control their light transmission so that the content regions 172 have good contrast.

The controller 140 may be configured to control the electronic drivers 130 to address the plurality of electrochromic regions 120 so that all of the electrochromic regions 120 corresponding to the content regions 172 have a change in light transmission.

The controller 140 may be configured to control the electronic drivers 130 to address the plurality of electrochromic regions 120 so that only some of electrochromic regions 120 corresponding to the content regions 172 have a change in light transmission.

The controller 140 may be configured to control the electronic drivers 130 to address the plurality of electrochromic regions 120 so that only content regions 172 designated as important have an increased contrast. The content regions 172 designated as important may include regions indicating errors, faults or danger, for example. For example, referring to FIG. 11, the content region 172a may be designated as important, while the content region 172b may not be designated as important. In this case, a voltage may be selectively applied only to the electrochromic regions so that only the content region 172a has an increased contrast.

The controller 140 may be configured to control the electronic drivers 130 to address the plurality of electrochromic regions 120 so that content regions 172 have a contrast of a first amount and the non-content regions 174, or the content regions 172 which are not designated as important, have a contrast of a second amount, wherein the first amount is greater than the second amount.

Figure 12:
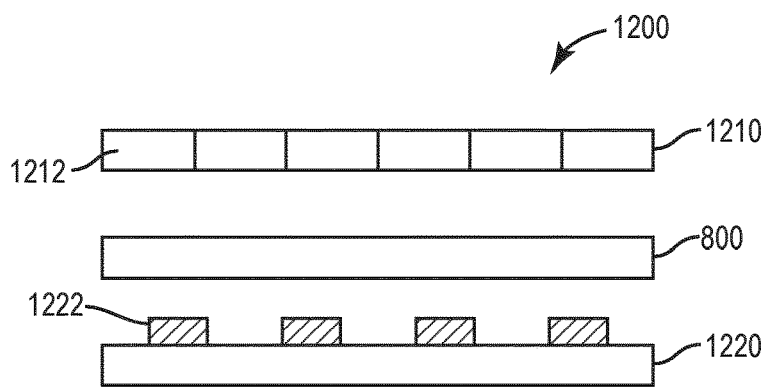
FIG. 12 is a schematic illustrating an LCD display according to inventive concepts disclosed herein.

FIG. 12 is a schematic illustrating a display 1200 including the optical device 800 of FIG. 8 with a plurality of electrochromic regions 120 arranged in an array, or including the optical device 100 of FIG. 7 with the single electrochromic regions 120. The display 1200 may be a LCD display, for example. The display 1200 may include an LCD layer 1210 having a plurality of LCD elements 1212. The LCD elements 1212 may correspond to pixels, and are controlled to operate to transmit or block light. The display 1200 may include a backlight 1220 having a plurality of LEDs 1222. The LEDs 1222 of the backlight 1220 emit light, such as white light, which is transmitted to the LCD layer 1210. The display 1200 may be an LCD display with a diffusing cavity between the LEDs 1222 and the LCD layer 1210, or the LEDs 1222 may be arranged to provide direct illumination of the LCD layer 1210.

The optical device 800 with its electrochromic layer 110 (see FIG. 8) may be disposed between the backlight 1220 and the LCD layer 1210. The electrochromic layer 110 is controlled, as described with respect to FIG. 8, such that electrochromic regions have a desired transmission. Thus, the light from the backlight 1220 is selectively transmitted to different regions of the LCD layer 1210.

As an alternative to being an LCD display, the display 1200 may be and organic light emitting diode display, or a micro-LED display, for example.

Figure 13:
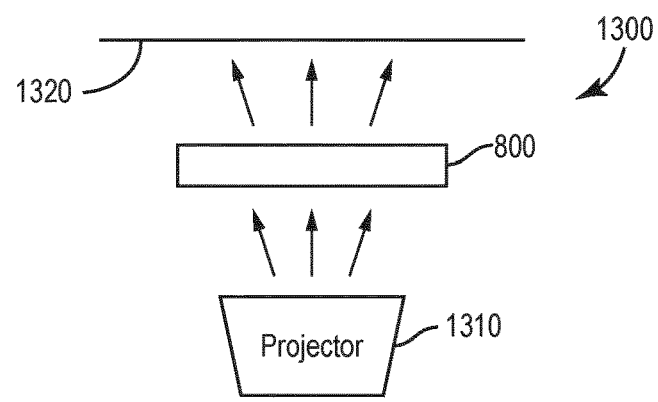
FIG. 13 is a schematic illustrating a projection system according to inventive concepts disclosed herein.

FIG. 13 is a schematic illustrating a display 1300 including the optical device 800 of FIG. 8 with a plurality of electrochromic regions 120 arranged in an array, or including the optical device 100 of FIG. 7 with the single electrochromic regions 120. The display 1300 may be a projection system, for example. The display 1300 may include a projector 1310 and a screen 1320. The projector 1310 emits image light which is transmitted to the screen 1320 to form an image on the screen 1320.

The optical device 800 with its electrochromic layer 110 (see FIG. 8) may be disposed between the projector 1310 and the screen 1320. The electrochromic layer 110 is controlled, as described with respect to FIG. 8, such that electrochromic regions have a desired transmission. Thus, the light from the projector 1310 is selectively transmitted to different regions of the screen 1320. As an alternative to the screen 1320 in FIG. 13, a combiner may be employed.

Figure 14:
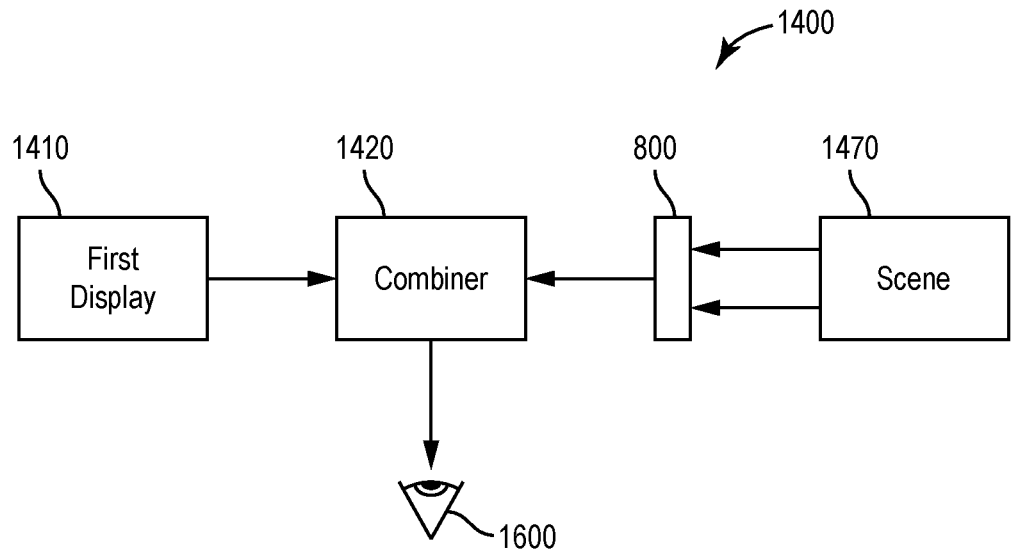
FIG. 14 is a schematic illustrating a display system with a combiner according to inventive concepts disclosed herein.

FIG. 14 is a schematic illustrating a display system 1400 including the optical device 800 of FIG. 8 with a plurality of electrochromic regions 120 arranged in an array, or including the optical device 100 of FIG. 7 with the single electrochromic regions 120. The display system 1400 may be for combining an image from a first display 1410 and an image from a scene 1470. In addition to the first display 1410, the display system 1400 includes a combiner 1420. The combiner 1420 combines the light from the scene 1470 with the image light from the first display 1410, where the combined light is provided to an observer 1600. The display system 1400 may be a helmet mounted display (HMD), head worn display (HWD), or a heads up display (HUD), for example.

The optical device 800 with its electrochromic layer 110 (see FIG. 8) may be disposed between the combiner 1420 and the scene 1470. The electrochromic layer 110 is controlled, as described with respect to FIG. 8, such that electrochromic regions have a desired transmission. Thus, the light from the scene 1470 is selectively transmitted to the combiner 1420.

Figure 15:
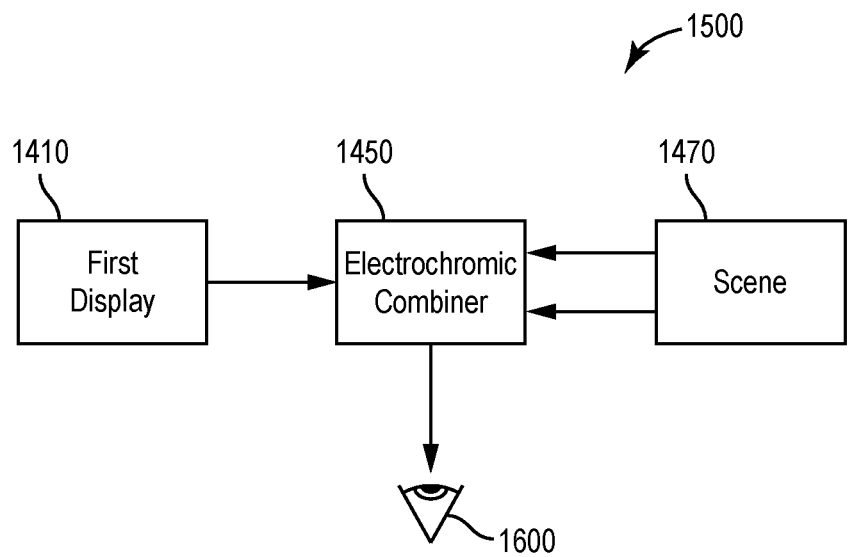
FIG. 15 is a schematic illustrating a display system with a combiner, where an electrochromic layer is part of the combiner, according to inventive concepts disclosed herein.

FIG. 15 is a schematic illustrating a display system 1500 including the optical device 800 of FIG. 8 with a plurality of electrochromic regions 120 arranged in an array, or including the optical device 100 of FIG. 7 with the single electrochromic regions 120. The display system of FIG. 15 is similar to that of FIG. 14, except that in the system of FIG. 15, the optical device 800 of FIG. 8 is part of a combiner 1450, instead of being separated from the combiner. The combiner 1450 combines the light from the scene 1470 with the image light from the first display 1410, where the combined light is provided to an observer 1600. The display system 1500 may be a helmet mounted display (HMD), head worn display (HWD), or a heads up display (HUD), for example.

The display system 1500 of FIG. 15, where the optical device 800 of FIG. 8 is part of a combiner 1450, has advantages over display system 1400 of FIG. 14 in allowing for an increased transmission of light from the scene 1470 to the observer 1600. The display system 1400 of FIG. 14, where the combiner 1420 is separate from the optical device 800, may be arranged to have good transmission of the optical device 800 by including index matching materials, such as ITO coating layers for electrically stimulating the electrochromic material, on both sides of the electrochromic materials, i.e., both on the side receiving light from the scene 1470, and the side toward the first display 1410. On the other hand, the combiner 1450 which includes the optical device 800 has a high light transmissive side receiving light from the scene 1470, but has a higher reflectivity on the side receiving light from the first display 1410. This allows an increased transmission of light from the scene 1470 to the observer 1600. Additionally, providing the optical device 800 of FIG. 8 as part of the combiner 1450 can reduce the overall size of the system.

The higher reflectivity of the optical device 800 on a side may be achieved by index of refraction mismatch between the electrochromic material on that side by choosing an appropriate coating for the electrochromic material with a material having an index of refraction that does not match that of the electrochromic material.

For the combiner 1450 which includes the optical device 800, the light receiving side need be highly reflective on the first display 1410 side only over a wavelength range of the first display 1410. That is, if the first display 1410 provides green light, the light receiving side need only be highly reflective for green light.

The embodiments of the inventive concepts disclosed herein have been described in detail with particular reference to preferred embodiments thereof, but it will be understood by those skilled in the art that variations and modifications can be effected within the spirit and scope of the inventive concepts.

What is claimed is:

1. An optical device comprising:
    an electrochromic layer comprising a plurality of electrochromic regions separated from each other;
    a plurality of electronic drivers arranged to electrically connect with and drive respective electrochromic regions via a plurality of electrodes contacting the electrochromic regions;
    a controller configured to control the plurality of electronic drivers to individually address each of the plurality of electrochromic regions to selectively drive some of the plurality of electrochromic regions to change light transmission of the selectively driven plurality of electrochromic regions;
    and
    a display region including content regions and non-content regions;
    wherein the controller is configured to control the electronic drivers to address the plurality of electrochromic regions so that electrochromic regions corresponding to the content regions are decreased in light transmission, and the electrochromic regions corresponding to the non-content regions are not decreased in light transmission,
    whereby contrast of the content regions is increased without increasing the contrast of the non-content regions,
    and
    wherein the controller is configured to control the electronic drivers to:
        address the plurality of electrochromic regions so that the electrochromic regions corresponding to a sun region through which the sun is viewed are decreased in light transmission;
        and
        cause the one or more electronic drivers to apply different voltages to different of the plurality of electrodes, the different voltages including at least one sinusoidal voltage.

2. The optical device of claim 1, wherein the plurality of electrochromic regions are arranged as a plurality of parallel stripes.

3. The optical device of claim 1, wherein the plurality of electrochromic regions are arranged as a plurality of concentric regions.

4. The optical device of claim 3, wherein the optical device is a camera, and the plurality of electrochromic regions form an iris.

5. The optical device of claim 1, wherein the plurality of electrodes includes three or more electrodes, further comprising:

a light intensity sensor arranged to detect light intensity of regions of a two-dimensional scene, the regions of the scene respectively corresponding to the plurality of electrochromic regions, the controller configured to control the one or more electronic drivers to cause the one or more electronic drivers to apply different voltages to different of the plurality of electrodes to set the light transmission of the plurality of electrochromic regions corresponding to the regions of the scene based on detected light intensity of respective of the regions of the scene.

6. The optical device of claim 5, wherein the controller is configured to control the one or more electronic drivers to cause the one or more electronic drivers to apply different voltages to different of the plurality of electrodes to set the light transmission to be lower for the electrochromic regions which correspond to the regions of the scene having a greater detected light intensity.

7. The optical device of claim 1, wherein:

the plurality of electrodes includes three or more electrodes;

the controller is configured to control the one or more electronic drivers to cause the one or more electronic drivers to apply time varying voltages to the plurality of electrodes; and the time varying voltages applied have a different frequency for different of the plurality of electrodes.

8. The optical device of claim 1, wherein the optical device is part of a projection system display, further comprising:

a projection screen or a combiner; and a projector arranged to project an image to the projection screen, wherein the electrochromic layer is disposed between the projector and the projection screen or combiner.

9. The optical device of claim 1, wherein the optical device is part of a display system, further comprising:

a first display; and a combiner arranged to combine an image from a scene and an image from the first display to provide a combined image, wherein the electrochromic layer is disposed between the scene and the combiner.

10. The display of claim 9, wherein the display is selected from a group including a helmet mounted display, head worn display, or a heads up display.

11. The optical device of claim 1, wherein the optical device is part of a display system, further comprising:

a first display; and a combiner arranged to combine an image from a scene and an image from the first display to provide a combined image, wherein the electrochromic layer is part of the combiner.

* * * * *